United States Patent [19]

Yano

[11] Patent Number: 5,990,211

[45] Date of Patent: *Nov. 23, 1999

[54] METHOD FOR KNEADING SILANE COUPLING AGENT-BLENDED RUBBER COMPOSITION

[75] Inventor: Masashi Yano, Sayama, Japan

[73] Assignee: Bridgestone Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/770,961

[22] Filed: Dec. 20, 1996

[30] Foreign Application Priority Data

Oct. 18, 1996 [JP] Japan .................................. 8-276347
Dec. 12, 1996 [JP] Japan .................................. 8-332486

[51] Int. Cl.⁶ ................................ C08K 5/54; C08K 9/06
[52] U.S. Cl. ......................... 524/262; 524/265; 524/493; 523/213
[58] Field of Search .................................. 524/262, 265, 524/493; 523/213

[56] References Cited

U.S. PATENT DOCUMENTS

| | | | |
|---|---|---|---|
| 3,500,496 | 3/1970 | Perlberg et al. | 425/144 |
| 4,151,157 | 4/1979 | Williams et al. | 260/42.15 |
| 4,517,336 | 5/1985 | Wolff et al. | 524/571 |
| 5,227,425 | 7/1993 | Rauline | 524/493 |
| 5,580,919 | 12/1996 | Agostini et al. | 524/493 |
| 5,804,636 | 9/1998 | Nahmias et al. | 524/493 |

FOREIGN PATENT DOCUMENTS

| | | |
|---|---|---|
| 0103754 | 3/1984 | European Pat. Off. . |
| 0731133 | 9/1996 | European Pat. Off. . |
| 0732362 | 9/1996 | European Pat. Off. . |
| 7-196850 | 8/1995 | Japan .................. C08L 9/06 |
| 97 09162 | 3/1997 | WIPO . |

*Primary Examiner*—James J. Seidleck
*Assistant Examiner*—Olga Asinovsky
*Attorney, Agent, or Firm*—Sughrue, Mion, Zinn, Macpeak & Seas, PLLC

[57] ABSTRACT

In a method for kneading a silane coupling agent-blended rubber composition prepared by blending a natural rubber and/or a diene group synthetic rubber with silica and a silane coupling agent, a coupling reaction of the silica with the silane coupling agent is carried out in a temperature range of 130 to 140° C.

13 Claims, 4 Drawing Sheets

FIG. 1

(AN ARROW IN THE GRAPH SHOWS A KNEADING END POINT)

(ARROWS IN THE RESPECTIVE GRAPHS (a) TO (f) SHOW KNEADING END POINTS)

(ARROWS IN THE RESPECTIVE GRAPHS (a) TO (c) SHOW KNEADING END POINTS)

METHOD FOR KNEADING SILANE COUPLING AGENT-BLENDED RUBBER COMPOSITION

BACKGROUND OF THE INVENTION (i) Field of the Invention

The present invention relates to a method for kneading a rubber composition obtained by blending a rubber component with silica and a silane coupling agent.

(ii) Description of the Prior Art

Carbon black has so far been used as a reinforcing filler for rubber. This is because carbon black has a high reinforcing strength and abrasion resistance as compared with other fillers. In recent years, under social requirements for energy saving and resource saving, a reduction in heat generation of a compounded rubber has been required at the same time particularly for saving fuel consumption of automobiles.

Silica is known as a heat generation-reducing filler for a compounded rubber. Particles of silica tend to coagulate due to a hydrogen bond of a silanol group which is a surface functional group of silica, and therefore a kneading time has had to be extended in order to improve a dispersion of silica particles into rubber. In particular, since the surface of silica is hydrophilic due to characteristics of a silanol group thereof while rubber is lipophilic, there has been the defect that because of mutual repulsion, it is difficult to mix and disperse them and therefore sufficiently good dispersion cannot be secured.

Further, the surface of silica particles is acid, and therefore silica has the defect that since silica adsorbs a base substance used as a vulcanization accelerator when a rubber composition is vulcanized, the vulcanization does not go on sufficiently, which results in the poor elastic modulus.

In order to overcome these defects, a silica-blended rubber composition is blended with a silane coupling agent. Usually, a reaction mechanism of silane coupling agents is considered as follows.

Figure 2:
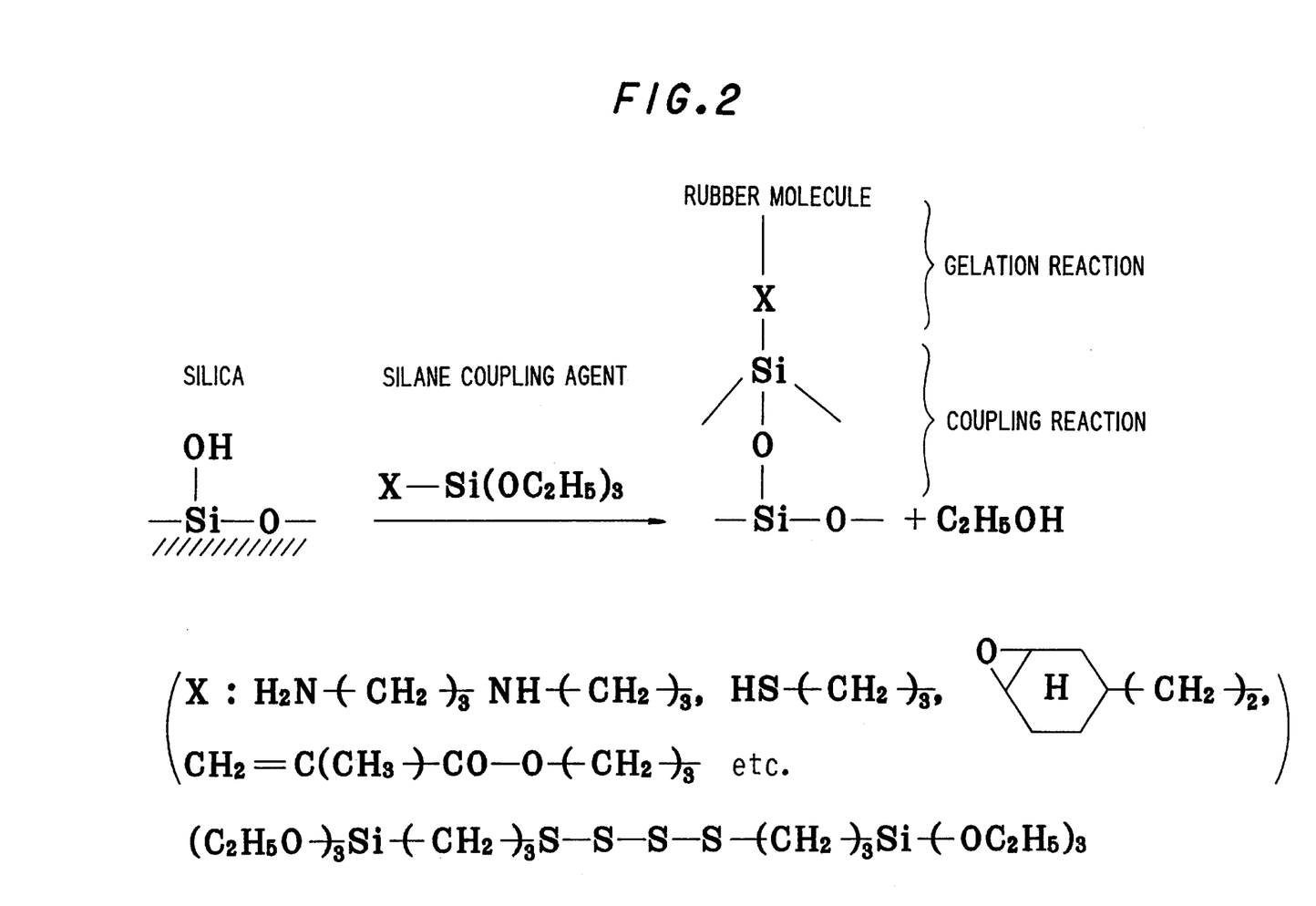
FIG. 2 is a diagram for explaining a reaction mechanism of the silane coupling agent and silica with the rubber molecules.
Figure 3A:
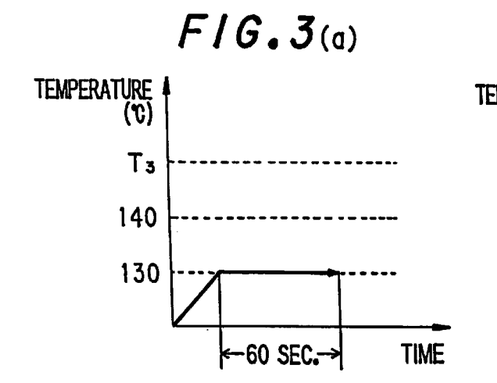
FIGS. 3(a) to (f) are graphs showing kneading patterns of the kneading conditions in the examples and the comparative examples.
Figure 3B:
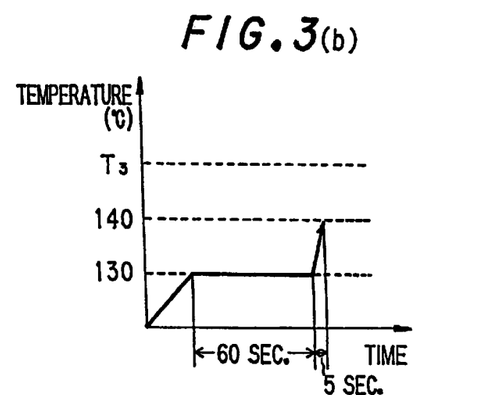
Figure 3C:
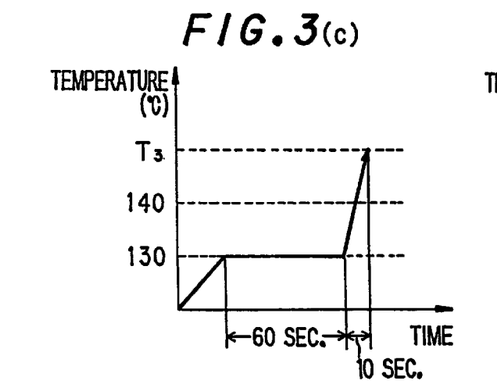
Figure 3D:
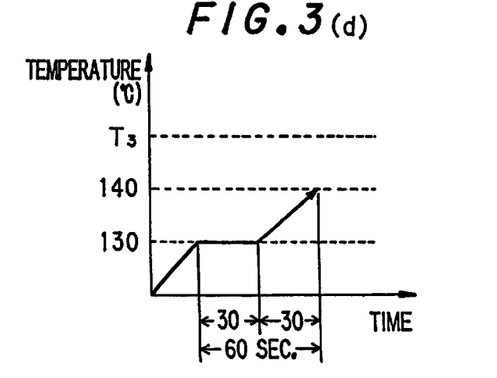
Figure 3E:
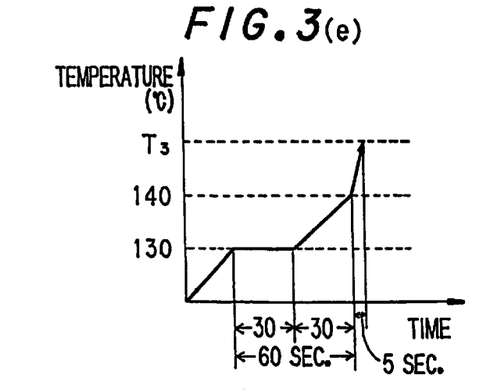
Figure 3F:
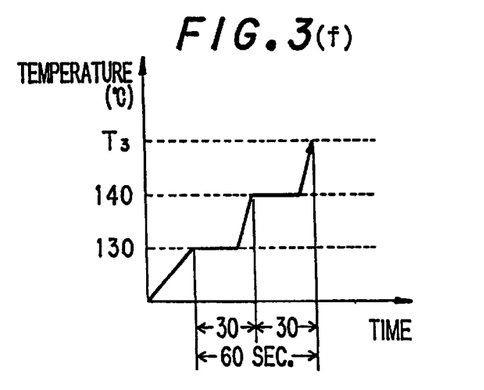

In general, it is estimated that a silane coupling agent used in the rubber industry decreases, as shown in FIG. 2, silanol groups present on the surface of silica particles by dehydrate-condensation reaction (coupling reaction of silica with the silane coupling agent) of the silanol groups on the surface of silica with silanol groups produced by hydrolysis of alkoxyl groups contained in the silane coupling agent to thereby improve the dispersion of silica into the rubber and that the silane coupling agent is chemically combined with rubber molecules by a reaction (gelation) of another functional group of the silane coupling agent with the rubber molecules to form a reinforcing structure.

The preceding coupling reaction of silica with the silane coupling agent is hard to take place at low temperatures, and the reaction is considered to go on at temperatures of 140° C. or higher in a rubber kneading process. In addition, there is the problem that when the coupling reaction described above proceeds insufficiently, egg-blisters are produced. Further, since the coupling reaction is an exothermic reaction, temperatures of 170° C. or higher are reached in a short time.

On the other hand, high temperatures of 170° C. or higher brings about a three-dimensional bridging reaction of rubber and increases rapidly the viscosity.

Accordingly, the existing state is that a sufficiently long reaction time of silica with a silane coupling agent cannot be taken in an actual rubber kneading step and that in order to carry out sufficiently the coupling reaction of silica with the silane coupling agent, a step of kneading—cooling—kneading—is repeated many times, usually 5 times or more. Accordingly, problems are present in terms of the workability and the productivity. Another existing state is that the dispersion of silica has not yet reached a sufficiently high level and in particular, the industrially good dispersion of silica has not been obtained.

Disclosed in Japanese Patent Application Laid-Open No. Hei 7-196850 is a rubber composition obtained by a mechanical treatment including at least one heat treatment of a copolymer having specific physical properties comprising conjugated diene and aromatic vinyl and silica having specific physical properties at temperatures falling in a range of 130 to 180° C., preferably 145° C. or higher.

In this rubber composition described in Japanese Patent Application Laid-Open No. Hei 7-196850, the copolymer having specific physical properties and silica having specific physical properties are combined and subjected to a heat treatment at temperatures falling in the preceding range of 130 to 180° C., preferably 145° C. or higher in order to obtain a rubber composition having an excellent abrasion resistance. It is described only in the test F of the paragraph No. 53 to use a silane coupling agent, and little description on the silane coupling agent can be found. In addition, it is not disclosed at all to enhance a dispersibility of silica into rubber by controlling reaction temperatures in a coupling reaction of conventional silica with a silane coupling agent.

SUMMARY OF THE INVENTION

The present invention is made to solve the conventional problems described above, and an object of the present invention is to improve dispersibility of silica into rubber by controlling conditions of a coupling reaction of silica with a silane coupling agent in a rubber composition prepared by blending a rubber component with silica and the silane coupling agent and to provide a method for kneading a silane coupling agent-blended rubber composition for obtaining the rubber composition which is excellent in a low heat-generating property and an abrasion resistance.

Intensive investigations made by the present inventor in order to solve the conventional problems described above have resulted in finding newly that in a rubber composition prepared by blending a rubber component with silica and a silane coupling agent, there is a specific temperature range in which a coupling reaction of silica with the silane coupling agent proceeds, whereby a dispersion of silica into rubber is improved to a large extent to successfully obtain the rubber composition which is excellent in a low heat-generating property, a wet resistance and an abrasion resistance, and thus coming to complete the present invention.

That is, the method for kneading a silane coupling agent-blended rubber composition according to the present invention comprises the following constitutions (1) to (17).

(1) A method for kneading a silane coupling agent-blended rubber composition comprises the steps of: blending a natural rubber and/or a diene group synthetic rubber with silica and a silane coupling agent; kneading a blended rubber composition; and carrying out a coupling reaction of the silica with the silane coupling agent in a temperature range of 130 to 140° C.

(2) The method for kneading a silane coupling agent-blended rubber composition as described in above (1) further comprises the step of carrying out a gelation reaction of the silane coupling agent with rubber molecules in a temperature range of 140° C. or higher.

(3) The method for kneading a silane coupling agent-blended rubber composition as described in above (1) further comprises the step of carrying out the coupling reaction of the silica with the silane coupling agent and a gelation reaction of the silane coupling agent with the rubber molecules in a temperature range of 140° C. or higher.

(4) The method for kneading a silane coupling agent-blended rubber composition as described in above (1), wherein time for carrying out the coupling reaction described above is 60 seconds or more in a temperature range of 130° C. or higher.

(5) The method for kneading a silane coupling agent-blended rubber composition as described in above (3), wherein time for carrying out the coupling reaction described above is 60 seconds or more in the aggregate in a temperature range of 130° C. or higher.

(6) The method for kneading a silane coupling agent-blended rubber composition as described in above (3), wherein time for carrying out the coupling reaction described above is 30 seconds or more in a temperature range of 140° C. or higher.

(7) The method for kneading a silane coupling agent-blended rubber composition as described in above (1), wherein the preceding step of kneading the blended rubber composition is completed when a temperature range of 130 to 140° C. is reached.

(8) The method for kneading a silane coupling agent-blended rubber composition as described in above (2), wherein the preceding step of kneading the blended rubber composition is completed when a temperature range of 145 to 170° C. is reached.

(9) The method for kneading a silane coupling agent-blended rubber composition as described in above (3), wherein the preceding step of kneading the blended rubber composition is completed when a temperature range of 145 to 170° C. is reached.

(10) The method for kneading a silane coupling agent-blended rubber composition as described in above (1), wherein time for kneading the blended rubber composition described above is 60 seconds or more in a temperature range of 130° C. or higher.

(11) The method for kneading a silane coupling agent-blended rubber composition as described in above (3), wherein time for kneading the blended rubber composition described above is 60 seconds or more in the aggregate in a temperature range of 130° C. or higher.

(12) The method for kneading a silane coupling agent-blended rubber composition as described in above (3), wherein time for kneading the blended rubber composition described above is 30 seconds or more in a temperature range of 140° C. or higher.

(13) The method for kneading a silane coupling agent-blended rubber composition as described in above (1), wherein a blend amount of the silica described above is 1 to 100 parts by weight per 100 parts by weight of the rubber component.

(14) The method for kneading a silane coupling agent-blended rubber composition as described in above (1), wherein a blend amount of the silane coupling agent described above is 1 to 30% by weight based on the weight of the silica.

(15) The method for kneading a silane coupling agent-blended rubber composition as described in above (1) further comprises the step of blending carbon black as a reinforcing filler in an amount of 200 parts by weight or less per 100 parts by weight of the rubber component.

(16) The method for kneading a silane coupling agent-blended rubber composition as described in above (1) further comprises the step of switching a rotation of a kneading rotor over to a low rate rotation when temperature reaches about 120° C.

(17) The method for kneading a silane coupling agent-blended rubber composition as described in above (1) further comprises the step of adding water when temperature reaches about 120° C.

According to the present invention, provided is a method for kneading a silane coupling agent-blended rubber composition, wherein the dispersibility of silica into the rubber is enhanced to a large extent. Further, the rubber composition obtained by this kneading method, in which the dispersibility of silica into the rubber has been enhanced to a large extent, has a good processability and does not produce egg-blisters. In addition, the rubber composition is excellent in a low heat-generating property, a wet resistance and an abrasion resistance and can suitably be applied to rubber products such as tires, conveyor belts, hoses, and the like.

DESCRIPTION OF PREFERRED EMBODIMENTS

The preferred embodiments of the present invention shall be explained below in detail.

Figure 1:
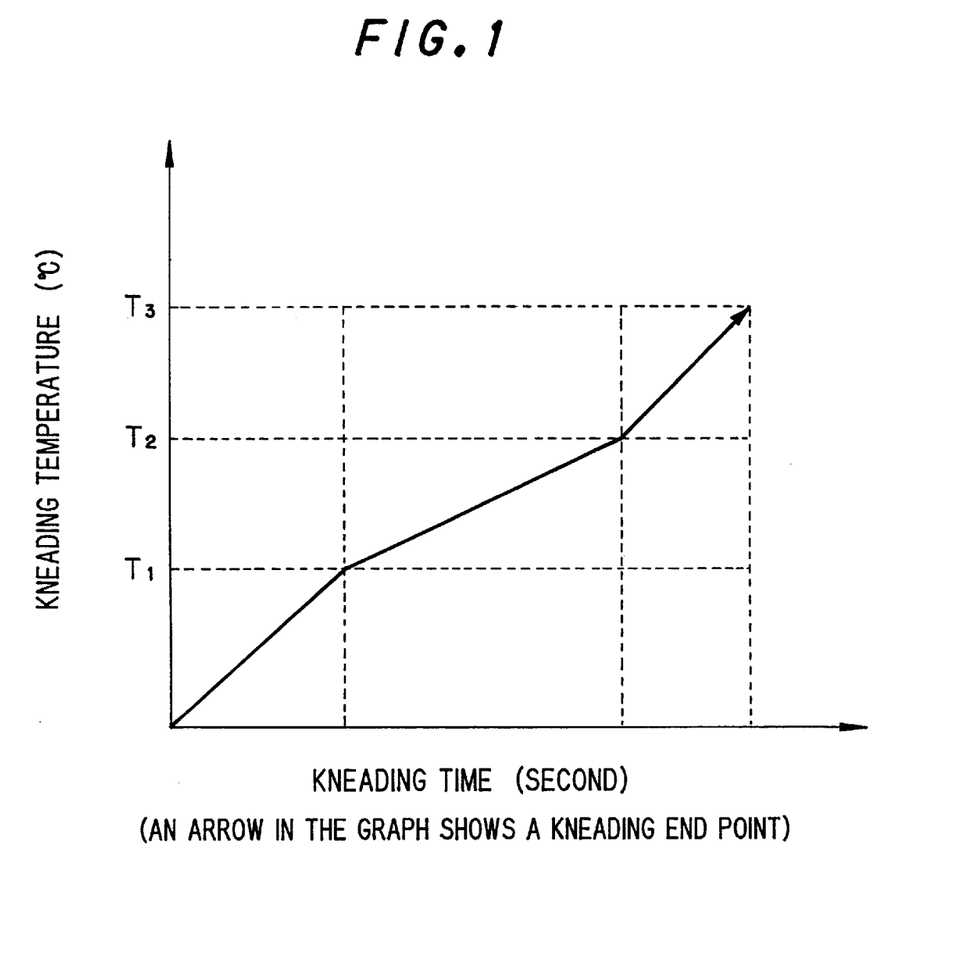
FIG. 1 is a graph showing a relation between a kneading time and kneading temperatures in a coupling reaction in the present invention.

The kneading method for a silane coupling agent-blended rubber composition according to the present invention (hereinafter called merely "the kneading method of the present invention") has been completed by finding newly the fact that there exists, as shown in FIG. 1, a temperature range $T_1$ to $T_2$ in which the dispersion of silica is accelerated by the coupling reaction of silica with the silane coupling agent, that is, a range of a coupling reaction-starting temperature $T_1$ to a gelation-starting temperature $T_2$.

Further, it has newly been found that there exists a temperature range $T_2$ to $T_3$ in which the silane coupling agent is reacted with rubber molecules to form a reinforcing structure, that is, a range of the gelation-starting temperature $T_2$ to an upper limit temperature $T_3$ of the workability (sheet property) and that the gelation forming this reinforcing structure may be carried out in a series of the kneading steps including the step of carrying out the coupling reaction described above and may further be carried out in the step of vulcanizing the rubber.

The dispersion of silica is accelerated in some cases also in the preceding gelation temperature range $T_2$ to $T_3$ when a temperature distribution in the coupling reaction of silica with the silane coupling agent is uneven in the temperature range $T_1$ to $T_2$ described above.

Accordingly, in the method for kneading the rubber composition prepared by blending a natural rubber and/or a diene group synthetic rubber with silica and the silane coupling agent, the kneading method of the present invention is characterized by including the step of carrying out the coupling reaction of silica with the silane coupling agent in a temperature range of 130 to 140° C.

Further, the kneading method of the present invention is characterized by including the step of carrying out the gelation reaction of the silane coupling agent with the rubber molecules in a temperature range of 140° C. or higher. Or, the kneading method of the present invention is characterized by including the step of carrying out the coupling reaction of silica with the silane coupling agent and the gelation reaction of the silane coupling agent with the rubber molecules in this temperature range of 140° C. or higher.

In the kneading method of the present invention, the temperature range $T_1$ to $T_2$ in which the dispersion of silica is accelerated by the coupling reaction of silica with the silane coupling agent resides in 130 to 140° C.

The coupling reaction-starting temperature $T_1$ is 130° C., and the coupling reaction goes on in a temperature range of from this coupling reaction-starting temperature $T_1$ up to 140° C. which is the gelation-starting temperature $T_2$. Thus, the dispersion of silica is accelerated in this temperature range $T_1$ to $T_2$.

The temperature of lower than 130° C. causes the problems that a sufficient reaction of silica with the silane coupling agent is not carried out and egg-blisters are generated in extruding this blended matter. Meanwhile, since the temperature exceeding 140° C. accelerates the gelation reaction of the silane coupling agent with the rubber molecules, the kneaded matter is gelatinized to make it difficult for silica to be dispersed. In addition, temperatures of 170° C. or higher are reached in a short time, and therefore a coupling reaction time of silica with the silane coupling agent becomes insufficient, which results in the insufficient dispersion of silica.

As described above, an uneven temperature distribution is present in the temperature range $T_2$ to $T_3$, and therefore a non-reacted part in the coupling reaction remains in some cases, wherein the coupling reaction continues over 140° C. This accelerates the dispersion of silica by the coupling reaction in some cases also in the gelation temperature range $T_2$ to $T_3$. $T_1$, $T_2$ and $T_3$ show average temperatures in the inside of the kneaded matter.

A reaction time for carrying out the coupling reaction of silica with the silane coupling agent, that is, the kneading time of the present invention in this case is 60 seconds or more, preferably 70 seconds or less in the aggregate in a temperature range of 130° C. or higher. To be specific, the kneading time needed when the coupling reaction is carried out over 140° C. is 60 seconds or more in terms of a kneading time accumulated from the temperature range of 130° C. or higher.

The coupling reaction of silica with the silane coupling agent is sufficiently carried out in this temperature range $T_1$ to $T_2$, and the dispersibility of silica into the rubber is improved.

Since the preceding coupling reaction of silica with the silane coupling agent and the like are an exothermic reaction, and the kneading temperature of the blended rubber composition is elevated during the kneading, the temperature has to be controlled to 130 to 140° C. The temperature can be controlled by a method in which the kneading is carried out by switching a rotation of a kneading rotor of a kneading machine such as a banbury mixer over to a low rate rotation at a stage where the temperature is about 120° C., and/or a method in which water is added to the blended rubber composition at a stage where the temperature is about 120° C. to lower the temperature.

In the kneading method of the present invention, the gelation reaction of the silane coupling agent with the rubber molecule starts in a temperature range of 140° C. or higher, and the reaction is accelerated in a temperature range of 145 to 170° C. which is an upper limit temperature $T_3$ of the workability (sheet property). Since the temperatures have to be varied according to the kind of the rubber used or the kinds and the amounts of the compounds for rubber such as oil and wax, the temperature $T_3$ has a wide range.

The above temperature of less than 140° C. does not cause the reaction of the silane coupling with the rubber molecule to go on sufficiently. Meanwhile, the temperature exceeding 170° C. causes a three-dimensional bridging reaction of the rubber and results in a rapid increase in the viscosity.

In the temperature range of 140° C. or higher, preferably 145 to 170° C. (145° C.$\leq T_2$ to $T_3 \leq$170° C.), a kneading time for carrying out the gelation reaction of the silane coupling agent with the rubber molecule and the like is 30 seconds or more, preferably 30 to 40 seconds.

The reaction of the silane coupling agent with the rubber molecule is carried out sufficiently in this temperature range ($T_2$ to $T_3$) and the kneading time described above forms a reinforcing structure of the silane coupling agent with the rubber molecule.

The gelation reaction for forming this reinforcing structure may be carried out in a series of the kneading steps including the step of carrying out the coupling reaction described above and also may be carried out in the step of vulcanizing the rubber after finishing a kneading operation in the step of carrying out the coupling reaction.

As described above, the dispersion of silica is accelerated by the coupling reaction in some cases also in the preceding gelation temperature range of $T_2$ to $T_3$ when a temperature distribution in the coupling reaction is uneven. Accordingly, the coupling reaction of silica with the silane coupling agent and the gelation reaction of the silane coupling agent with the rubber molecules may be carried out in the temperature range of 140° C. or higher. In this case, when a reaction time for carrying out the coupling reaction of silica with the silane coupling agent does not satisfy a condition of 60 seconds or more at 130° C. or higher, the coupling reaction is carried out preferably for 30 seconds or more, preferably 32 to 40 seconds in the temperature range of 140° C. or higher. It is best as a matter of course that both requisites of 60 seconds or more at 130° C. or higher and 30 seconds or more at 140° C. or higher are satisfied.

In the present invention, when the kneading operation is finished in the step of carrying out the coupling reaction of silica with the silane coupling agent, the operation is finished when the temperature reaches a range of 130 to 140° C. at which the coupling reaction of silica with the silane coupling agent is finished. Further, when the gelation reaction is carried out in a series of the kneading steps including the step of carrying out the coupling reaction, the kneading operation is finished when the temperature reaches a range of 145 to 170° C. at which the gelation reaction is finished.

The kneading operation described above are carried out preferably at one stage but may be carried out dividing it into two or more stages.

Natural rubber (NR), diene group synthetic rubber and a blending thereof can be used alone or in a blending for the rubber component used in the present invention. The synthetic rubber includes, for example, synthetic polyisoprene rubber (IR), polybutadiene rubber (BR) and styrene-butadiene rubber (SBR).

Synthetic silicic acid hydrate is preferred as silica used in the present invention but shall not specifically be restricted.

A blend amount of silica is 1 to 100 parts by weight, preferably 10 to 40 parts by weight per 100 parts by weight of the rubber component in view of a reinforcing property, a low heat-generating property and a workability.

The silane coupling agent used in the present invention shall not specifically be restricted as long as it is usually used in the rubber industry. To be specific, preferred are bis(3-triethoxysilylpropyl)tetrasulfide, γ-mercaptopropyltriethoxysilane, γ-aminopropyltriethoxysilane, N-phenyl-γ-aminopropyltrimethoxysilane, and N-β-(aminoethyl)-γ-aminopropyltrimethoxysilane. A blend amount of the silane coupling agent is 1 to 30% by weight, preferably 10 to 20% by weight based on the weight of silica.

The blend amount of the silane coupling agent of less than 1% by weight reduces the coupling effect, and the amount exceeding 30% by weight increases sliding in kneading to extend the kneading time and therefore does not provide the effective kneading time. Accordingly, it is not preferred.

SAF, ISAF and HAF can preferably be used as carbon black used for a reinforcing filler in the present invention, but it shall not specifically be restricted thereto. A blend amount of carbon black is preferably 200 parts by weight or less per 100 parts by weight of the rubber component described above.

The blend amount of carbon black exceeding 200 parts by weight deteriorates the low heat-generating property to a large extent. The blend amount thereof is preferably 5 to 40 parts by weight in view of the reinforcing property and the low heat-generating property.

In the present invention, compounding agents usually used in the rubber industry such as softening agents (wax, oil and the like), anti-oxidants, vulcanizing agents, vulcanization accelerators and vulcanization accelerator aids can suitably be blended, if necessary, in addition to the rubber component, silica, the silane coupling agent, and carbon black as the reinforcing filler each described above.

In the kneading method of the present invention, the dispersion of silica is accelerated by kneading the rubber component, silica, the silane coupling agent, carbon black as the reinforcing filler, and the preceding rubber compounding agents blended if necessary by means of a banbury mixer in the temperature range $T_1$ to $T_2$ in the preceding kneading time to carry out the coupling reaction of silica with the silane coupling agent.

When the gelation reaction is carried out in a series of the kneading steps including the step of carrying out the coupling reaction, the gelation reaction of the the silane coupling agent with the rubber molecules is carried out in the temperature range $T_2$ to $T_3$ in the kneading time described above to form the reinforcing structure (low heat-generating property and high abrasion resistance).

The kneading method of the present invention can be applied to all of methods (kneading methods) for kneading rubber compositions blended with silica and silane coupling agents, whereby rubber products such as tires, conveyor belts and hoses which are the products produced by the above methods can be provided with an excellent low heat-generating property and abrasion resistance.

EXAMPLES

The present invention shall more specifically be explained below with reference to examples and comparative examples, but the present invention shall by no means be restricted by these examples.

In the following examples and comparative examples, the kneading temperatures were controlled by switching a rotation of a kneading rotor of a banbury mixer over to a low rate rotation at a stage of about 120° C. and/or adding water at a stage of about 120° C.

Examples 1 to 18 and Comparative Examples 1 to 5

Comparative Examples 1 to 5

Rubber compositions were prepared by kneading the blend components in the kneading conditions shown in the following Table 1, that is, by kneading the blend components which were the same as or corresponded to those of Example 1 shown in the following Table 2 in the kneading conditions falling in the outside of the present invention.

The blend components in Comparative Examples 1 to 5 and Examples 1 to 18 described later were kneaded in the conditions corresponding to the respective kneading patterns shown in FIGS. 3(a) to (f) and FIGS. 4(a) to (c).

Examples 1 to 10

Rubber compositions were prepared by kneading the blend components in the kneading conditions shown in the following Table 2, that is, by kneading the blend components which were the same as or corresponded to those of Example 1 in the kneading conditions falling in the scope of the present invention in Examples 2 to 10.

Examples 11 to 18

Rubber compositions were prepared by kneading the blend components in the kneading conditions shown in the following Table 3, that is, by changing the blend components and kneading them in the kneading pattern of the kneading conditions corresponding to FIG. 4(b) in Example 8.

The dispersibilities of silica into the rubbers in the rubber compositions thus obtained in Examples 1 to 18 and Comparative Examples 1 to 5 were evaluated synthetically at a non-vulcanizing stage in terms of macro dispersion and micro dispersion. After vulcanization, the tan δ (low heat generating property), the wet resistances and the abrasion resistances were evaluated. Further, the processabilities of the rubber compositions immediately after kneading and the presence of egg-blisters generated were evaluated as well.

The dispersibilities at a non-vulcanizing stage, and the tan δ (low heat-generating property), the wet resistances, the abrasion resistances, the processabilities and the egg-blisters after vulcanization were evaluated by the following methods.

The tan δ (low heat-generating property), the wet resistances and the abrasion resistances in Examples 1 to 10 and Comparative Examples 1 to 5 were evaluated on the basis of those of Example 8 as a matter of convenience and were expressed by indices with those of Example 8 being set at 100. In Examples 11 to 18, they were evaluated on the basis of those of Example 11 and were expressed by indices with those of Example 11 being set at 100.

The results thereof are shown in the following Tables 1 to 3.

(1) Dispersibility of Silica at Non-vulcanizing Stage

A test piece was cut out of a non-vulcanized rubber and measured for a degree of macro dispersion by means of SEM (scanning electron microscope, magnification: 200 times)

and a degree of micro dispersion by means of TEM (transmission electron microscope, magnification: 20,000 times) to evaluate them according to the following evaluation criteria:

Evaluation Criteria

⊙: both macro dispersion and micro dispersion are good

○: macro dispersion is good

X: macro coagulated lumps remain (2) tan δ (Low Heat-generating Property)

The values of tan δ were determined according to JIS K6301. It is shown that the smaller the value of tan δ is, the better the tan δ is, and the more excellent the low heat-generating property is.

(3) Wet Resistance

Tires (size: 185/70R13) for passenger cars in which the rubber compositions obtained in Examples 1 to 18 and Comparative Examples 1 to 5 were used for tread materials were manufactured by way of trial. They were installed into a passenger car for test to determine a turning radius in running on a wet road at a constant speed of 60 km/hr. It is shown that the smaller the value is, the smaller the turning radius is, and the more excellent the wet resistance is.

(4) Abrasion Resistance

Tires (size: 185/70R13) for passenger cars in which the rubber compositions obtained in Examples 1 to 18 and Comparative Examples 1 to 5 were used for tread materials were manufactured by way of trial. They were installed into a passenger car for test to determine an abrasion loss in running 0 to 10,000 km. It is shown that the smaller the value is, the smaller the abrasion loss is, and the more excellent the abrasion resistance is.

(5) Processability

A sheet property observed immediately after kneading and extruding was evaluated and expressed by an index based on the following evaluation criteria.

In the evaluation criteria, the evaluation is based on that of Example 8 (standard value: 1), and the larger the value becomes from 1 to 5 (maximum), the better the sheet property is; and the more the value is reduced from 1 to 0 and minus, the more the sheet property crumbles to decay, and the more the processability is deteriorated.

(6) Egg-blister

The presence of egg-blisters on the rubber compositions obtained immediately after kneading and extruding was inspected to evaluate it according to the following criteria:

Evaluation Criteria

○: No troubles caused by egg-blisters

X: Egg-blisters generated to cause troubles

TABLE 1

|  | Comparative Example | | | | |
|---|---|---|---|---|---|
|  | 1 | 2 | 3 | 4 | 5 |
| Blend components | | | | | |
| SBR | — | — | — | — | — |
| NR | 50 | 50 | 50 | 50 | 50 |
| BR | 50 | 50 | 50 | 50 | 50 |
| Silica*1 | 30 | 30 | 30 | 30 | 30 |
| Carbon black | 30 | 30 | 30 | 30 | 30 |
| Silane coupling agent*2 | 3 | 3 | 3 | 3 | 3 |
| Oil | 10 | 10 | 10 | 10 | 10 |
| Wax | 1 | 1 | 1 | 1 | 1 |
| Anti-oxidant | 1 | 1 | 1 | 1 | 1 |
| Vulcanization accelerator (NS) | 0.7 | 0.7 | 0.7 | 1.0 | 1.0 |
| Sulfur | 1.3 | 1.3 | 1.3 | 1.3 | 1.3 |
| Kneading conditions | | | | | |
| Kneading pattern (FIG.) | 3 (a) | 4 (c) | 4 (b) | 4 (b) | 4 (b) |
| Temperature; $T_1$ (° C.) | 130 | 130 | 130 | 130 | 130 |
| Temperature; $T_2$ (° C.) | 130 | 140 | 140 | 140 | 140 |
| Kneading time (second) | 40 | 40 | 40 | 40 | 40 |
| Temperature; $T_2$ (° C.) | — | — | 140 | 140 | 140 |
| Temperature; $T_3$ (° C.) | — | — | 150 | 160 | 170 |
| Kneading time (second) | — | — | 10 | 15 | 18 |
| Temperature (° C.) in discharging | 130 | 140 | 150 | 160 | 170 |
| Evaluation | | | | | |
| Non-vulcanization: silica dispersibility | xx | x | x | Δ | ○~Δ |
| tan δ (low heat-generating property) | 140 | 130 | 120 | 110 | 105 |
| Wet resistance | 140 | 130 | 120 | 110 | 105 |
| Abrasion resistance | 130 | 120 | 110 | 105 | 102 |
| Processability | 5 | 4.5 | 1 | 0~−1 | −5 |
| Egg-blister | Found | Found | Found | Found | Found |

*1: Manufactured by Nippon Silica Co., Ltd. brand name: Nip Seal AQ,
*2: Manufactured by Degusa Co., Ltd.; brand name: Si 69 bis-(3-triethoxysilylpropyl)tetrasulfide

TABLE 2

|  | Example | | | | | | | | | |
|---|---|---|---|---|---|---|---|---|---|---|
|  | 1 | 2 | 3 | 4 | 5 | 6 | 7 | 8 | 9 | 10 |
| Blend components | | | | | | | | | | |
| SBR | — | — | — | — | — | — | — | — | — | — |
| NR | 50 | 50 | 50 | 50 | 50 | 50 | 50 | 50 | 50 | 50 |
| BR | 50 | 50 | 50 | 50 | 50 | 50 | 50 | 50 | 50 | 50 |
| Silica*1 | 30 | 30 | 30 | 30 | 30 | 30 | 30 | 30 | 30 | 30 |
| Carbon black | 30 | 30 | 30 | 30 | 30 | 30 | 30 | 30 | 30 | 30 |

TABLE 2-continued

| | Example | | | | | | | | | |
|---|---|---|---|---|---|---|---|---|---|---|
| | 1 | 2 | 3 | 4 | 5 | 6 | 7 | 8 | 9 | 10 |
| Silane coupling agent*[2] | 3 | 3 | 3 | 3 | 3 | 3 | 3 | 3 | 3 | 3 |
| Oil | 10 | 10 | 10 | 10 | 10 | 10 | 10 | 10 | 10 | 10 |
| Wax | 1 | 1 | 1 | 1 | 1 | 1 | 1 | 1 | 1 | 1 |
| Anti-oxidant | 1 | 1 | 1 | 1 | 1 | 1 | 1 | 1 | 1 | 1 |
| Vulcanization accelerator (NS) | 0.7 | 0.7 | 0.7 | 1.0 | 1.0 | 1.3 | 0.7 | 0.7 | 0.7 | 0.7 |
| Sulfur | 1.3 | 1.3 | 1.3 | 1.3 | 1.3 | 1.3 | 1.3 | 1.3 | 1.3 | 1.3 |
| Kneading conditions | | | | | | | | | | |
| Kneading pattern (FIG.) | 3 (a) | 3 (b) | 3 (c) | 3 (d) | 3 (e) | 3 (f) | 4 (a) | 4 (b) | 4 (c) | 4 (b) |
| Temperature; $T_1$ (° C.) | 130 | 130 | 130 | 130 | 130 | 130 | 130 | 130 | 130 | 130 |
| Temperature; $T_2$ (° C.) | 130 | 140 | 140 | 140 | 140 | 140 | 140 | 140 | 140 | 140 |
| Kneading time (Second) | 60 | 65 | 60 | 60 | 60 | 30 | 35 | 30 | 60 | 30 |
| Temperature; $T_2$ (° C.) | — | 140 | 140 | 140 | 140 | 140 | 140 | 140 | 140 | 140 |
| Temperature; $T_3$ (° C.) | — | — | 160 | — | 160 | 160 | 160 | 160 | — | 170 |
| Kneading time (second) | — | — | 10 | — | 5 | 30 | 25 | 30 | — | 40 |
| Temperature (° C.) in discharging | 130 | 140 | 160 | 140 | 160 | 160 | 160 | 160 | 140 | 170 |
| Evaluation | | | | | | | | | | |
| Non-vulcanization: silica dispersibility | ○ | ○ | ◎ | ○ | ◎ | ◎ | ◎ | ◎ | ○ | ◎ |
| tan δ (low heat-generating property) | 140 | 130 | 100 | 120 | 100 | 100 | 100 | 100 | 110 | 65 |
| Wet resistance | 100 | 100 | 100 | 100 | 100 | 100 | 100 | 100 | 120 | 80 |
| Abrasion resistance | 120 | 110 | 100 | 110 | 100 | 100 | 100 | 100 | 110 | 60 |
| Processability | 5≦ | 5 | 3 | 4 | 4 | 3 | 2 | 1 | 3 | 0.5 |
| Egg-blister | None | None | None | None | None | None | None | None | None | None |

*[1]: Manufactured by Nippon Silica Co., Ltd. brand name: Nip Seal AQ,
*[2]: Manufactured by Degusa Co., Ltd.; brand name: Si 69 bis-(3-triethoxysilylpropyl)tetrasulfide

TABLE 3

| | Example | | | | | | | |
|---|---|---|---|---|---|---|---|---|
| | 11 | 12 | 13 | 14 | 15 | 16 | 17 | 18 |
| Blend components | | | | | | | | |
| SBR | — | — | 100 | — | 20 | 100 | 100 | 100 |
| NR | 50 | 50 | — | 100 | 80 | — | — | — |
| BR | 50 | 50 | — | — | — | — | — | — |
| Silica*[1] | 30 | 40 | 30 | 15 | 10 | 15 | 20 | 30 |
| Carbon black | 30 | 40 | 60 | 30 | 45 | 90 | 140 | 200 |
| Silane coupling agent*[2] | 3 | 4 | 3 | 1.5 | 1 | 1.5 | 2 | 3 |
| Oil | 10 | 20 | 25 | 0 | 0 | 60 | 90 | 120 |
| Wax | 1 | 1 | 1 | 1 | 1 | 1 | 1 | 1 |
| Anti-oxidant | 1 | 1 | 1 | 1 | 1 | 1 | 1 | |
| Vulcanization accelerator (NS) | 0.7 | 0.7 | 0.7 | 1.0 | 1.0 | 1.3 | 0.7 | 0.7 |
| Sulfur | 1.3 | 1.3 | 1.3 | 1.3 | 1.3 | 1.3 | 1.3 | 1.3 |
| Kneading conditions | | | | | | | | |
| Kneading pattern (FIG.) | 4 (b) | 4 (b) | 4 (b) | 4 (b) | 4 (b) | 4 (b) | 4 (b) | 4 (b) |
| Temperature; $T_1$ (° C.) | 130 | 130 | 130 | 130 | 130 | 130 | 130 | 130 |
| Temperature; $T_2$ (° C.) | 140 | 140 | 140 | 140 | 140 | 140 | 140 | 140 |
| Kneading time (second) | 40 | 40 | 35 | 30 | 30 | 30 | 40 | 40 |
| Temperature; $T_2$ (° C.) | 140 | 140 | 140 | 140 | 140 | 140 | 140 | 140 |
| Temperature; $T_3$ (° C.) | 160 | 170 | 160 | 145 | 145 | 155 | 155 | 155 |
| Kneading time (second) | 30 | 40 | 25 | 35 | 35 | 30 | 20 | 20 |
| Temperature (° C.) in discharging | 160 | 170 | 160 | 145 | 145 | 155 | 155 | 155 |
| Evaluation | | | | | | | | |
| Non-vulcanization: silica dispersibility | ◎ | ◎ | ○ | ◎ | ◎ | ○ | ○ | ○ |
| tan δ (low heat-generating property) | 100 | 80 | 150 | 80 | 110 | 160 | 180 | 200 |
| Wet resistance | 100 | 80 | 60 | 90 | 90 | 80 | 70 | 60 |
| Abrasion resistance | 100 | 60 | 60 | 80 | 60 | 80 | 90 | 100 |

TABLE 3-continued

| | Example | | | | | | | |
|---|---|---|---|---|---|---|---|---|
| | 11 | 12 | 13 | 14 | 15 | 16 | 17 | 18 |
| Processability | 1 | 1 | 1 | 1 | 1 | 1 | 1 | 1 |
| Egg-blister | None | None | None | None | None | None | None | None |

*1: Manufactured by Nippon Silica Co., Ltd. brand name: Nip Seal AQ,
*2: Manufactured by Degusa Co., Ltd.; brand name: Si 69 bis-(3-triethoxysilylpropyl)tetrasulfide As shown in Tables 1 to 3, it has been clarified from a general point of view that the rubber compositions prepared in Examples 1 to 18 falling in the scope of the present invention have the good dispersibilities of silica at a non-vulcanizing stage and are excellent in tan δ (low heat-generating property), a wet resistance, an abrasion resistance and a processability after vulcanizing as compared with those of Comparative Examples 1 to 5 falling in the outside of the present invention and that troubles caused by egg-blisters do not take place, and the dipersibility of silica into the rubber is raised to a large extent.

Observing individual cases, the kneading was carried out in a temperature range of 130 to 140° C. at a kneading time of less than 60 seconds in Comparative Examples 1 to 5 falling in the outside of the present invention, and the kneading was carried out in a temperature range of 140° C. or higher in Comparative Examples 3 to 5. Since in these cases, the kneading time in the temperature range of 130 to 140° C. is short, the coupling reaction of silica with the silane coupling agent does not proceed sufficiently, and the dispersibility of silica at a non-vulcanizing stage is inferior. Accordingly, the processability is low, and egg-blisters are produced. In addition, it has been found that the tan δ (low heat-generating property), the wet resistance and the abrasion resistance after vulcanization are low as well.

In contrast with this, in Examples 1 to 10 falling in the scope of the present invention, the kneading was carried out in the kneading conditions falling in the scope of the present invention, that is, in the temperature range of 130 to 140° C. at the kneading time of 60 seconds or more and/or in the temperature range of 140° C. or higher at the kneading time of 30 seconds or more while the blend components were the same as those of Comparative Examples 1 to 5 falling in the outside of the present invention. Since in these cases, the coupling reaction of silica with the silane coupling agent goes on sufficiently, and the dispersibility of silica at a non-vulcanizing stage is improved. Accordingly, the processability is good, and egg-blisters are not produced. In addition, it has been found that the tan δ (low heat-generating property), the wet resistance and the abrasion resistance after vulcanization are excellent.

Figure 4A:
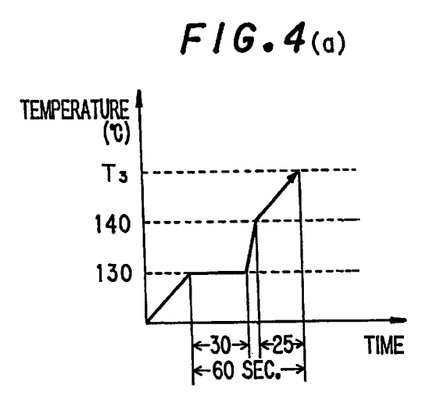
FIGS. 4(a) to (c) are continued from FIG. 3 and are graphs showing kneading patterns of the kneading conditions in the examples and the comparative examples.
Figure 4B:
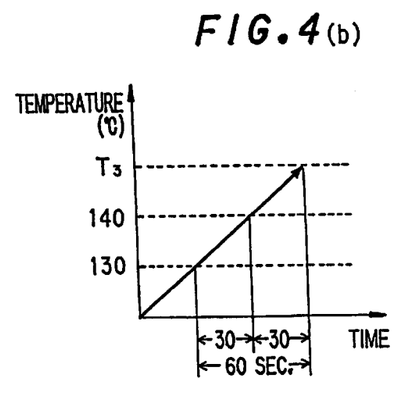
Figure 4C:
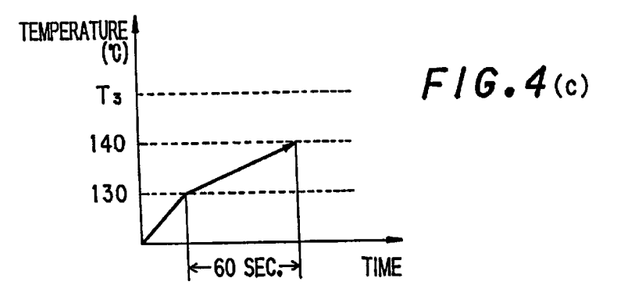

Further, in Examples 11 to 18 falling in the scope of the present invention, the blend components were changed, and the kneading pattern in the kneading conditions was based on FIG. 4(b) in Example 8. Since also in these cases, the coupling reaction of silica with the silane coupling agent goes on sufficiently as well, and the dispersibility of silica at a non-vulcanizing stage is improved. Accordingly, the processability is good, and egg-blisters are not produced. In addition, it has been found that the tan δ (low heat-generating property), the wet resistance and the abrasion resistance after vulcanization are excellent.

What is claimed is:

1. A method for kneading a silane coupling agent-blended rubber composition, the method consisting essentially of the steps of:

blending a natural rubber and/or a diene group synthetic rubber with silica and a silane coupling agent;

kneading the blended rubber composition;

raising the temperature of the blended rubber composition to a temperature range of 130 to 140° C. and allowing a coupling reaction of the silica with the silane coupling agent for 30 to 65 seconds;

further raising the temperature of the blended rubber composition to a temperature range of 140° C. or higher and allowing a coupling reaction of the silica with the silane coupling agent and a gelation reaction of the silane coupling agent with the natural and/or diene group synthetic rubber, wherein the coupling reaction and the gelation reaction are carried out for 60 seconds to 70 seconds total in a temperature range of 130° C. or higher, including 20 seconds to 40 seconds in a temperature range of 140° C. or higher; and stopping the kneading when the temperature of the blended rubber composition reaches a temperature in the range of 145 to 170° C.

2. The method for kneading a silane coupling agent-blended rubber composition as described in claim 1, wherein the silica is present in an amount of 1 to 100 parts by weight per 100 parts by weight of the rubber component.

3. The method for kneading a silane coupling agent-blended rubber composition as described in claim 1, wherein the silane coupling agent is present in an amount of 1 to 30% by weight based on the weight of the silica.

4. The method for kneading a silane coupling agent-blended rubber composition as described in claim 1, further comprising the step of blending into the composition carbon black as a reinforcing filler in an amount of 200 parts by weight or less per 100 parts by weight of the rubber component.

5. The method for kneading a silane coupling agent-blended rubber composition as described in claim 1, further comprising the step of switching a rotation of a kneading rotor over to a low rate rotation when temperature reaches about 120° C.

6. A method for kneading a silane coupling agent-blended rubber composition, the method consisting essentially of the steps of:

blending a natural rubber and/or a diene group synthetic rubber with silica and a silane coupling agent;

kneading the blended rubber composition;

raising the temperature of the blended rubber composition to a temperature range of 130 to 140° C. and allowing a coupling reaction of the silica with the silane coupling agent for 30 to 65 seconds, wherein the temperature is raised continuously between the range of 130 to 140° C.;

further raising the temperature of the blended rubber composition to a temperature range of 140° C. or higher and allowing a coupling reaction of the silica with the silane coupling agent and a gelation reaction of the silane coupling agent with the natural and/or diene group synthetic rubber, wherein the coupling reaction and the gelation reaction are carried out for 60 seconds to 70 seconds total in a temperature range of 130° C. or higher; and stopping the kneading when the temperature of the blended rubber composition reaches a stopping temperature in the range of 145 to 170° C., wherein the temperature is raised continuously from 140° C. to the stopping temperature.

7. The method as claimed in claim 1, wherein said temperature range of 140° C. or higher is 145–170° C.

8. A method for kneading a silane coupling agent-blended rubber composition, the method consisting essentially of the steps of:

(a) blending a natural rubber and/or a diene group synthetic rubber with silica and a silane coupling agent;

(b) kneading the blended rubber composition;

(c) raising the temperature of the blended rubber composition to a temperature $T_1$ within the range of 130 to 140° C.;

(d) maintaining the temperature at said temperature $T_1$ and allowing a coupling reaction of the silica with the silane coupling agent for about 30 to 60 seconds;

(e) then raising the temperature of the blended rubber composition to a second temperature $T_2$, higher than $T_1$ and within the range of 140° C. or higher, and allowing a coupling reaction of the silica with the silane coupling agent and a gelation reaction of the silane coupling agent with the natural and/or diene group synthetic rubber; and (f) further raising the temperature and then stopping the kneading when the temperature of the blended rubber composition reaches a third temperature $T_3$, higher than temperature $T_2$ and in the range of 145 to 170° C., wherein, when the temperature is at a temperature of 130° C. or higher, the coupling reaction and the gelation reaction are carried out for 60 seconds to 70 seconds total.

9. The method as claimed in claim 8, wherein said temperature $T_1$ is 130° C.

10. The method as claimed in claim 8, wherein said temperature $T_2$ is 140° C.

11. The method as claimed in claim 8, wherein said temperature $T_2$ is maintained for about 30 seconds.

12. A method for kneading a silane coupling agent-blended rubber composition, the method consisting essentially of the steps of:

(a) blending a natural rubber and/or a diene group synthetic rubber with silica and a silane coupling agent;

(b) kneading the blended rubber composition;

(c) raising the temperature of the blended rubber composition to a temperature $T_1$ within the range of 130 to 140° C.;

(d) maintaining the temperature at said temperature $T_1$ and allowing a coupling reaction of the silica with the silane coupling agent for about 30 to 60 seconds;

(e) then raising the temperature of the blended rubber composition continuously from $T_1$ to a stopping temperature and allowing a coupling reaction of the silica with the silane coupling agent and a gelation reaction of the silane coupling agent with the natural and/or diene group synthetic rubber; and (f) stopping the kneading when the temperature of the blended rubber composition reaches a stopping temperature in the range of 145 to 170° C., wherein the coupling reaction and the gelation reaction are carried out for 60 seconds to 70 seconds total in a temperature range of 130° C. or higher.

13. The method as claimed in claim 12, wherein said temperature $T_1$ is 130° C.

* * * * *